(No Model.)

W. B. MANN.
PNEUMATIC TIRE.

No. 584,059. Patented June 8, 1897.

Witnesses.

Inventor;
Wm B. Mann,
by
his Atty.

UNITED STATES PATENT OFFICE.

WILLIAM B. MANN, OF BALTIMORE, MARYLAND.

PNEUMATIC TIRE.

SPECIFICATION forming part of Letters Patent No. 584,059, dated June 8, 1897.

Application filed January 18, 1897. Serial No. 619,539. (No model.)

*To all whom it may concern:*

Be it known that I, WILLIAM B. MANN, a citizen of the United States, residing at Baltimore city, in the State of Maryland, have invented certain new and useful Improvements in Pneumatically-Tired Vehicle-Wheels; and I do declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to pneumatically-tired vehicle-wheels; and its prime object is to provide an effective mode of connecting the tire and rim without employing fastenings of a rigid nature, such as metallic clips, cement, or other devices which unyieldingly bind the tire to the rim and thereby reduce its elasticity to a greater or less extent. I propose to effect a practical connection between the tire and the rim by peculiarities in the formation of these parts, whereby when the tire is inflated not only is it secure against lateral displacement, but also against longitudinal movement on the rim, or "creeping."

The invention is more particularly applicable to tires of the single-tube or "hose-pipe" variety, and in the accompanying drawings, which form part of this specification, I have illustrated an embodiment of the invention in a tire of the type above mentioned.

Figure 1:
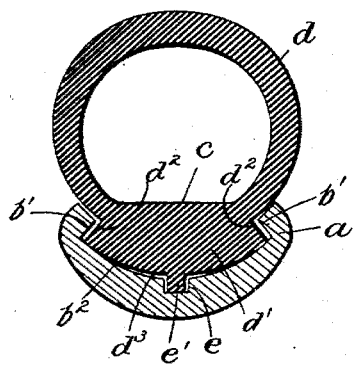
Figure 2:
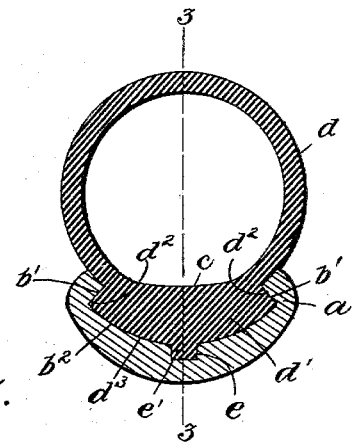
Figure 3:
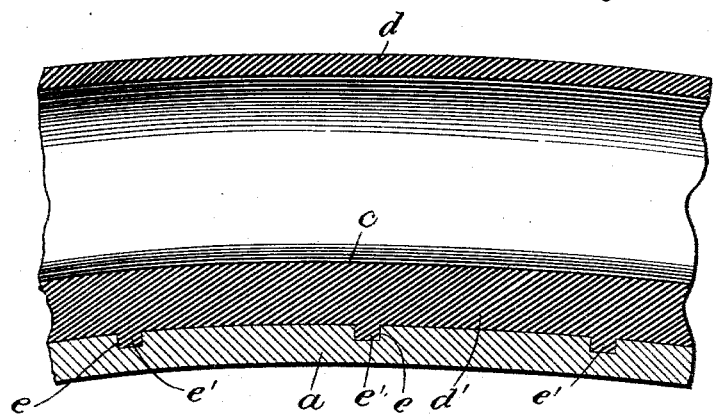

Of said drawings, Figures 1 and 2 show cross-sections of tire and rim embodying the invention in one form, Fig. 1 representing the tire deflated and Fig. 2 representing it inflated. Fig. 3 shows a longitudinal section of a portion of tire and rim taken on line 3 3 of Fig. 2.

In the said drawings the letter $a$ designates the wheel-rim, which is preferably a wood rim and is formed in its concave outer side with an encircling channel having undercut sides $b'$ and dished or concaved bottom $b^2$. The tire $d$, which, as before stated, is of the single-tube variety, is formed on the inner side with a solid rubber strip $d'$, extending continuously around the inner side of the tire and constituting a protruding elastic annulus, preferably integral with the tire. This strip or annulus occupies the rim-channel and is formed with flaring sides $d^2$ to engage the undercut sides of the said channel and with a convex surface $d^3$, extending between said flaring sides and seating against the concave base or bottom $b^2$ of the channel. The interior surface $c$ of the tire immediately behind the protruding annulus does not normally partake of the cross-sectional curvature of the tire, but is flattened, so that in cross-section it cuts an arc of the circle of the tire, or, in other words, forms a chord of an arc of said circle. The solid rubber of the tire intervenes between this flattened interior surface $c$ and the outer surface $d^3$ of the annulus, so that pressure on said flattened surface will be felt throughout the annulus.

When the deflated tire is applied to the rim, as illustrated in Fig. 1, the protruding annulus seats against the bottom of the channel in the rim, but the flaring sides of the annulus are not brought into intimate contact with the undercut sides of the channel, and this looseness of engagement greatly facilitates the application of the tire to the rim, as will be apparent.

Upon inflation of the tire the pressure of the injected air upon the interior surface of the tire tends, of course, to distend said surface on all sides, and hence tends to bring the flattened surface $c$ to the curvature of the balance of the interior surface. As heretofore stated, the protruding annulus is seated against the bottom of the channel in the first instance, and so this pressure on the flattened surface $c$ has the effect of expanding the annulus only in a lateral direction, which results in pressing its sides into intimate engagement with the undercut sides of the channel, as illustrated in Fig. 2. The amount of this lateral expansion of the solid rubber will not, of course, be very great, but the annulus nearly fills the channel when first applied, and it requires but a comparatively slight expansion of the annulus to bring its sides into intimate engagement with the channel sides.

In further explanation of the peculiar effect produced by inflation it is to be said that the combined effect of the pressure directed against the flattened interior surface and the pressure distending the tire and thereby exerting a pull at each side of the flattened surface results in a very decided forcing of the middle portion of the annulus against its seat, and consequently effects the lateral expansion desired. It will be seen that the flattened interior surface or its equivalent—that is to say, a surface behind the annulus reëntrant of the cross-sectional circle of the tire—is essential to the production of an appreciable effect in this way.

The engagement thus produced between the tire and rim is such as to effectually resist any tendency to lateral displacement, and in fact resists displacement of the tire in any direction; but in order to absolutely prevent any longitudinal or creeping movement of the tire on the rim I make the following-described provisions: In the middle of the bottom of the rim-channel I make a longitudinal series of holes or sockets $e$, and in the molding of the tire protuberances $e'$ are formed upon the outer convex surface of the annulus $d'$, corresponding in location and arrangement with the sockets $e$, into which they are inserted in applying the tire to the rim. These protuberances are preferably made of such dimensions as to be capable of easy insertion into the sockets, and they may be made of such length that when the tire is inflated the consequent pressure of the protuberances against the bottoms of the sockets will cause them to expand into intimate engagement with the sides of the sockets.

It will be seen that the engagement of the elastic protuberances $e'$ with the sockets $e$ effectually prevents any longitudinal movement or creeping of the tire on the rim.

It will be seen that the above-described form of embodiment of the invention effectually accomplishes the object primarily stated—viz., that of providing means for effectively connecting an inflatable tire with its rim without the use of unyielding fastening means, but by peculiar formations of the parts themselves—*i. e.*, of the inflatable tire and the rim.

I do not limit myself to the precise form of construction shown in the drawings, as the invention is capable of embodiment in modified forms.

Having thus described my invention, what I claim is—

1. In a vehicle-wheel, the combination of a rim having a peripheral channel with undercut sides; and an inflatable elastic tire having a solid elastic annulus protruding from its inner side and seating against the bottom of the rim-channel, said annulus having flaring sides to engage the undercut channel sides, and the interior surface of the tire immediately behind the annulus being reëntrant of the cross-sectional circle of the tire and the annulus thus thickened through its middle portion, substantially as and for the purpose set forth.

2. In a vehicle-wheel, the combination of a rim having a peripheral channel with undercut sides and a series of sockets in its bottom; and an inflatable elastic tire having a solid elastic annulus protruding from its inner side and seating against the bottom of the rim-channel, said annulus having flaring sides to engage the undercut channel sides and a series of elastic protuberances engaging the sockets in the bottom of the channel and exceeding in length the depth of said sockets, the interior surface of the tire immediately behind the annulus being reëntrant of the cross-sectional circle of the tire and the annulus being thus thickened through its central portion, substantially as and for the purpose described.

In testimony whereof I affix my signature in presence of two witnesses.

WILLIAM B. MANN.

Witnesses:
CORA CARRICK,
MARTHA O'NEILL.